US009494023B2

(12) United States Patent
Turkenburg et al.

(10) Patent No.: US 9,494,023 B2
(45) Date of Patent: Nov. 15, 2016

(54) NANO-SENSORS FOR OIL AND GAS RESERVOIR CHARACTERIZATION (71) Applicant: Nederlandse Organisatie Voor Toegepast-Natuurwetenschappelijk Onderzoek TNO, Delft (NL)

(72) Inventors: Daniël H. Turkenburg, Eindhoven (NL); Patrick T. K. Chin, Voorburg (NL); Rudolf H. Fischer, Mierlo (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 142 days.

(21) Appl. No.: 14/394,585

(22) PCT Filed: Apr. 15, 2013

(86) PCT No.: PCT/IB2013/001161
§ 371 (c)(1),
(2) Date: Oct. 15, 2014

(87) PCT Pub. No.: WO2013/156866
PCT Pub. Date: Oct. 24, 2013

(65) Prior Publication Data
US 2015/0090456 A1 Apr. 2, 2015

Related U.S. Application Data (60) Provisional application No. 61/624,346, filed on Apr. 15, 2012.

(51) Int. Cl.
E21B 43/16 (2006.01)
G01V 9/00 (2006.01)
E21B 41/00 (2006.01)

(52) U.S. Cl.
CPC ........... *E21B 43/16* (2013.01); *E21B 41/0092* (2013.01); *G01V 9/00* (2013.01)

(58) Field of Classification Search
CPC ..................................................... E21B 43/16
See application file for complete search history.

(56) References Cited

U.S. PATENT DOCUMENTS 6,322,901 B1 11/2001 Bawendi et al.
7,534,489 B2 5/2009 Ying et al.
(Continued)

FOREIGN PATENT DOCUMENTS

WO 2011/076874 A1 6/2011
WO 2011/109782 A1 9/2011

OTHER PUBLICATIONS

International Searching Authority, International Search Report and the Written Opinion, International Application No. PCT/IB2013/001161, dated Jan. 29, 2014.

*Primary Examiner* — Zakiya W Bates
(74) *Attorney, Agent, or Firm* — Kelly Kordzik; Matheson Keys Daffer & Kordzik PLLC (57) ABSTRACT Enhanced oil recovery becomes increasingly important in satisfying the growing demand for fossil fuel. The efficiency of secondary recovery processes like water flooding is however largely influenced by the rock characteristics, fluid characteristics, chemistry and physics. For development of the full potential of secondary oil recovery, it remains a challenge to obtain sufficient knowledge about the reservoir conditions. The present invention provides a novel water-dispersed, nano-sensor composition based on. InP/ZnS quantum dots ("QDs") and atomic silver clusters, which exhibit a bright visible fluorescence combined with dedicated sensor functionalities. The QD and silver nano-sensors were tested in simulated reservoir conditions to determine their selected functionality to these reservoir conditions. The developed nano-sensors showed improved sensor functionalities towards pH, temperature, and subterranean reservoir rock, such, as clay or limestone.

20 Claims, 7 Drawing Sheets (56) References Cited

U.S. PATENT DOCUMENTS

2010/0148049 A1 6/2010 Csutak
2011/0214488 A1 9/2011 Rose et al.
2012/0285690 A1* 11/2012 Weaver .................... C09K 8/57
166/305.1

* cited by examiner

NANO-SENSORS FOR OIL AND GAS RESERVOIR CHARACTERIZATION

This application claims priority to U.S. Provisional Patent Application Ser. No. 61/624,346 filed Apr. 15, 2012, which is hereby incorporated by reference herein.

BACKGROUND AND SUMMARY

As a result of the ever expanding demand for energy, the world's easily accessible oil reserves become swiftly depleted. The oil and gas industry today has a typical recovery of hydrocarbons with value of 30-40%,[1,2] which indicates that the majority of the existing oil remains trapped in the pores of the oil bearing porous media. An increase in recovery efficiency (up to 60-80%)[1] will therefore be a key factor for meeting the increasing energy demands. To this end, there is a need for new and more sophisticated mapping and production techniques.

Injection of water, also referred to as water flooding,[3] is commonly applied to produce so-called secondary oil, resulting in an increase of the total recovery efficiency up to 50%.[4] The recovery results of a water flooding process is largely influenced by the rock and fluid characteristics within the particular reservoir.[5] Due to viscosity and capillary effects, water may however bypass confined oil that remains in the reservoir, leading to a so-called water breakthrough,[6] in which preferred water pathways are developed in the reservoir connecting injection sites directly to the producer well where the recovery of water overtakes that of the secondary oil; water breakthrough can set in long before depletion of a reservoir.[5]

These complex and challenging reservoir conditions require an improved knowledge of the subsurface physical and chemical properties. Reservoir flow characterization is regularly performed using isotope tracers, which are injected with the water flooding process to obtain the flow dynamics in a reservoir.[7] This is further extended with complementary techniques to image additional reservoir parameters, such as analysis on production profiles of reservoir fluids, pressure tests, and time lapse seismic examinations.[4]

The limitation of the commonly applied isotope tracers is that they primarily provide information on flow characteristics, and often do not possess any physical and chemical sensor functionality.[10] In addition, a significant number of reported tracers consist of either toxic compounds or radioactive nuclides.[8,9] This limits their use due to health, safety, environmental, and legislation issues.

As any additional information of physical and chemical properties within the reservoir and its fluids can add a significant contribution to improve the production process, there is a quest for an improved sensor system. Key characteristics for these sensors' functionalities are the temperature, amount and nature of dissolved ions, pressure, pH, and reservoir chemistry. As a consequence of the complex and hostile reservoir environment often encountered, many classical sensor materials (e.g., organic chromophores) have shown to be not suitable.[10,11]

Recent publications suggested nanomaterials with extended sensor functionality as one next step in reservoir characterization.[12,13] An important class of these nanomaterials are the so-called quantum dots ("ODs"). QDs are semiconductor nanocrystals,[14] which are not only brightly fluorescent, with a size-tunable fluorescent emission color, but have also proven to be a versatile platform for further functionalization.[15] QDs have been used as fluorescent nanomaterials in areas where stability, endurance, and specialized chemical functionalization are crucial. These areas are typically found in biomedical research where robust nano-sensors are demanded, often extended with dedicated surface functionality.[15,16]

Another and relative new type of "nano" particles are the so-called noble metal clusters. Their bright optical behavior, which is size-tunable, is to a certain extent comparable to that of QDs.[17] Their inert inorganic nature together with their relatively high chemical stability and solution process ability makes these noble metal clusters an interesting material to combine with the earlier discussed QDs in a mixed sensor for reservoir imaging. Water-dispersed nano-sensors are compatible with the commonly applied technique of water flooding and therefore an ideal starting point, as its infrastructure is readily available throughout the oil and gas industry for enhanced oil recovery.[3] Extended information about the specific chemical and physical conditions within the reservoir is beneficial to optimize secondary oil production.

Application of fluorescent nanomaterials as sensors added in a water flooding process for reservoir imaging demands a water-dispersible nanoparticle with a controlled stability. Embodiments of the present invention synthesize brightly luminescent InP/ZnS QDs and silver clusters with different emission colors and various water stabilizing surface coatings. The different emission colors are clearly easy to discriminate from each other, which is beneficial for multiplexing in a dedicated sensor composition. The challenging reservoir conditions (e.g., high salinity, high pH, and temperature) have often been found as the limiting factor on the stability of fluorescent materials for reservoir imaging. The use of inorganic chromophors based on the QDs and metal clusters described herein showed an improved stability in these challenging conditions. By applying different surface coatings on the nanomaterials, several sensor applications have been identified with respect to pH, chemical environment, temperature, and presence of solids representative within the reservoir.

In practical situations, the ratio of the photoluminescent intensity of different particles may be measured at the producer well. Direct interpolation of the emission ratios provides a unique fingerprint of the reservoir environment with respect to pH, chemical environment, temperature, and present solids. In addition, as the sensors were developed to function in the water phase, the typical background luminescence of oils showed not to be affected by the sensor functionality.

QDs and silver clusters are described herein as a class of materials for applications as luminescent probes with dedicated sensor functionalities for reservoir imaging, exhibiting stability and a significant freedom for surface chemistry.

DETAILED DESCRIPTION

Figure 9:
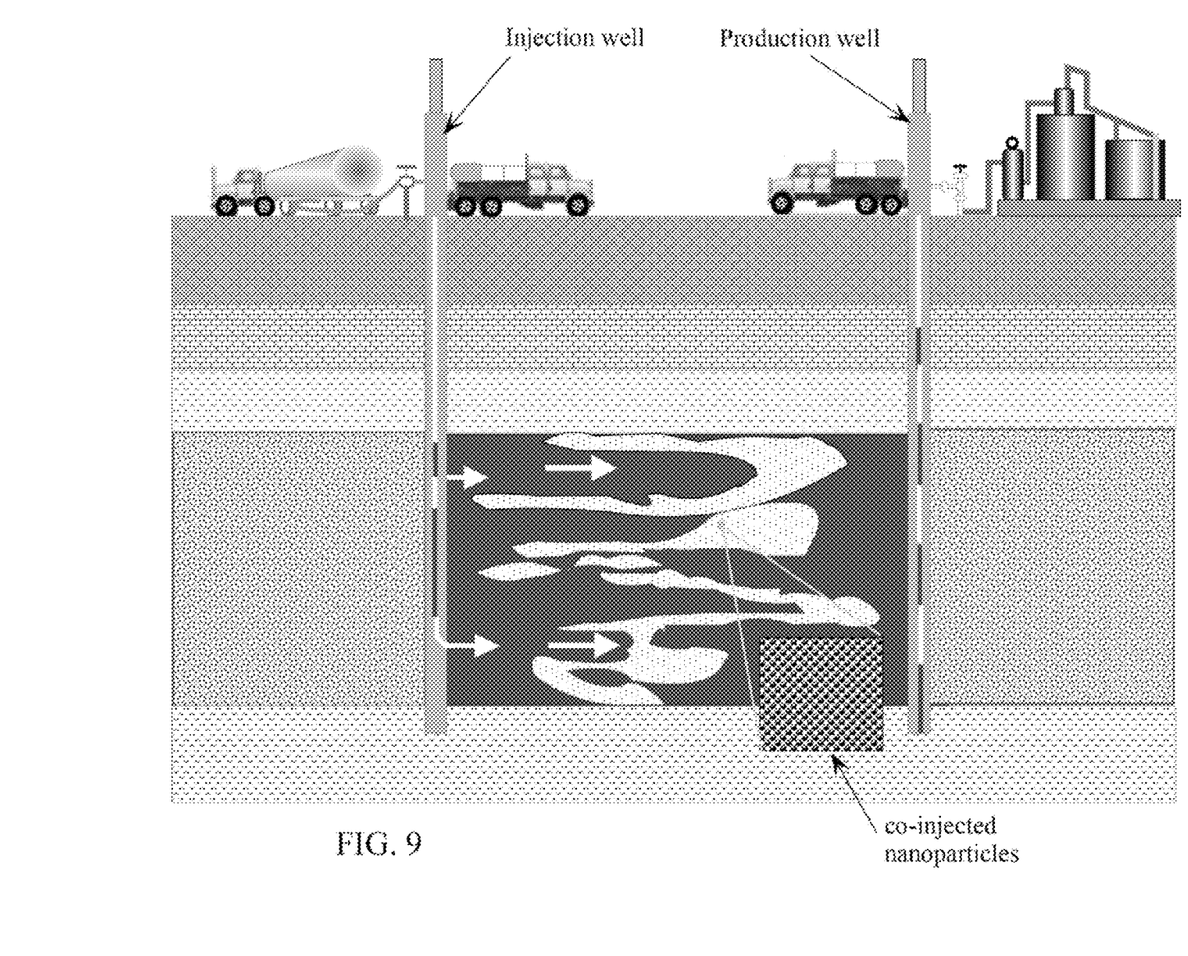
FIG. 9 illustrates a system and method for injecting particles into a reservoir in accordance with embodiments of the present invention.

Referring to FIG. 9, in embodiments of the present invention, QDs and noble metal clusters are implemented as a nano-sensor with specific functionality customized for reservoir management in a water flooding process. Embodiments of the present invention develop a nano-sensor composition based on InP/ZnS core shell QDs and atomic silver clusters. As these materials lay within the size range of 1-20 nm, there is no size limitation with respect to the pore size of the reservoir formation.[12] Due to the differences in surface chemistry of the nanomaterials, they experience different reactions depending on the specific local conditions. The nano-sensors may be injected into a formation at an injection well, including accompanying a water flooding process. After recovery of the nano-sensors from the production well, they are analyzed and the chemical and optical properties are compared to the initial situation before injection. The differences between both measurements provide a unique fingerprint of the reservoir and allow each of its signals to be attributed to specific chemical and physical parameters. Benefits of these nanoparticles are their proven robustness and chemical stability,[18] combined with the ability for extended surface chemistry to develop a mixed multifunctional sensor composition. To this end, developed were different types of QD and silver cluster based nano-sensors. These nano-sensors have their own specific targeted sensor functionality with respect to the reservoir environment. The relative bright and narrow band photoluminescence typically found for these nanomaterials enables the optical discrimination of the different sensor functionalities. The QD and Ag nano-sensors are completely water dispersible to avoid partition into the oil phase. Partial affinity for oil would increase the retention time tremendously. Water-dispersed luminescent nano-sensors also have a much lower detection limit compared to oil-dispersed QDs because their photoluminescence is not camouflaged by the absorption and background luminescence of crude oil itself.

Materials and Methods:

All quantities, times, temperatures, etc. are approximate.

Reagents: Zinc n-undecylenate, indium chloride; tris(trimethylsilyl)phosphine $(TMS)_3P$, hexadecylamine (HDA), stearic acid, sublimed sulfur, n-dodecanethiol, 1-octadecene (ODE), O-[2-(3-mercaptopropionylaminolethyl]-O'-methylpolyethylene glycol 5000, silver nitrate $(AgNO_3)$, α-lipoic acid, sodium borohydride (NaBH4), and calcium carbonate were commercially obtained from Sigma Aldrich. PE 18:0/18:0-PEG 2000 was commercially obtained from Lipoid. Natural crude oil (e.g., North Sea) was commercially provided by Shell directly after production without any additional processing. The EXM575 clay was commercially obtained from Südchemie, and Rhodamine 101 commercially obtained from Radient Dyes Chemie.

Synthesis of QDs: InP/ZnS quantum dots were synthesized under as nitrogen flow in accordance to a method published by Xu et al.[19] with modifications as described herein. $(TMS)_3P$ (60 mg; 0.2 mmol) was dissolved in ODE (1 mL) and swiftly injected into a reaction mixture of stearic acid (57 mg; 0.2 mmol), HDA (65 mg; 0.7 mmol), ODE (6 mL), zinc undecylenate (172 mg; 0.39 mmol) and indium chloride (44 mg, 0.2 mmol) 280° C. After stirring for 20 minutes at 240° C., the reaction was allowed to cool down to room temperature, followed by the addition of 100 mg zinc undecylenate (0.23 mmol), 108 mg HDA (0.45 mmol), and 6 mL ODE. Elemental sulfur (15 mg; 0.47 mmol) dissolved in ODE (2 mL) was added drop-wise during 20 minutes at 230° C., followed by an annealing step of 60 minutes at 200° C. The core shell InP/ZnS crystals were subsequently isolated by dissolving the reaction mixture in chloroform (10 mL), followed by precipitation through addition of acetone (20 mL). The QDs were isolated by centrifugation and re-dispersed in chloroform.

Synthesis of Ag nano-clusters: The Ag atomic clusters were synthesized following a method published by Adhikari et al.[20] with modifications described herein. α-☐ Lipoic acid (19 mg) and 14 mL of demi water were placed into a 50 ml flask. Subsequently, 7 mg of sodium borohydride was added, while stirring, a clear solution was obtained after 30 minutes. A solution of 2.94 mg of $AgNO_3$ in 700 μL water was added to the reduced dihydrolipoic acid (DHLA) solution while stirring. This was followed by the addition of an excess of sodium borohydride (10 mg dissolved in 2 ml water). Stirring was continued for more than 5 hours. A clear color change was observed from dark brown to a bright orange color after 4-5 hours.

Surface modification: The silica coating was performed with a procedure similar to the one published by Nann et al.[19] The capping exchange of surface bound ligands (HDA and stearic acid) with, O-[2-(3- mercaptopropionylamitiolethyl]-O'-methylpolyethylene glycol 5000 (PEG-SH) or dodecanethiol, was performed following the procedure published by Querner et al.[21] A 2-fold excess amount of thiol ligands was added to a 0.5 ml colloidal dispersion of HDA capped InP/ZnS QDs (10 mg/ml) and stirred at room temperature for >12 hours. Subsequently, the dodecanethiol-capped QDs where isolated by two cycles of precipitation through addition of methanol (0.5 mL) and redispersion in chloroform.

Lipid coating of QDs: A micellar polyethylene glycol ("PEG") coating was applied to make the QDs water-soluble.[22] This micellar coating comprised a pegylated phospholipid, PEG-DSPE (1,2-distearoyl-sn-glycero-3-phospho-ethanolamine-N-[methoxy-(poly(ethylene glycol))-2000]). The 6 mg InP/ZnS dodecanethiol-capped single washed QDs (3.2 mg InP/ZnS from TGA) were dissolved in 2 mL of chloroform and mixed with 18 mL PEG -DSPE (174 mg) dissolved in chloroform. The chloroform solution was slowly added to 70 mL water (1.5 hours) at 80° C. under vigorous stirring and nitrogen flow. Thermogravimetric analysis ("TGA") showed that on average 52% (w/w) of the single washed quantum dot content consists of InP/ZnS, whereas 48% of the mass was attributed to organic surfactants.

Optical Spectroscopy: UV-vis spectra were recorded (e.g., using a Hitachi U-2001 or Perkin Elmer Lambda 3b spectrophotometer). Steady state fluorescence spectra were measured (e.g., with a Perkin Elmer LS55 spectrophotometer).

Quantum yield: Photoluminescence quantum yields ($\eta_F$) were estimated using rhodamine 101 as a reference (in ethanol +0.01% HCl; $\eta_F$=100%).[23] All solutions had an optical density <0.1 at the excitation wavelength ($\lambda_{ex}$=520 nm) to minimize re-absorption and avoid absorbance saturation. The quantum yield was derived from luminescence spectra by correcting for the optical density and the refractive index of the solvents used for sample and reference.[24]

Transmission electron microscopy: TEM images were recorded (e.g., using a TECNAI G2 20 (FEI Company) microscope operated at 200 kV). TEM samples were prepared by placing a drop of QDs dispersed in chloroform on a carbon coated copper (e.g., 400-mesh) TEM grid. The excess liquid was removed with a filtration paper.

Simulated subterranean reservoir conditions: The influence of simulated reservoir conditions on the dispersed nano-sensors was tested using different media and the presence of solids. The influence of salt concentrations was tested by dispersing the nano-sensors in 2% (w/w) aqueous solution of $CaCl_2$, or 8% (w/w) aqueous solution of NaCl. Subsequently, the the influence of pH was tested in multi-component API brine solutions, simulating an actual reservoir environment. To this end, the nano-sensors were dispersed in buffered API brines (pH 6.5 and pH 9), containing 8% NaCl and 2% $CaCl_2$. The effect of elevated subterranean temperatures was tested by heating the dispersed nano-sensors in buffered pH 6.5 API brine (8% NaCl and 2% $CaCl_2$) for 10 minutes at 120° C. The acidic API brines were buffered using a 0.1 M acid, sodium acetate buffer (pH 6.5), and the alkaline brines were buffered using 0.1 M glycine at pH 9.5.

The behavior of the nano-sensors in the presence of solids was studied using the API brine pH 6.5 dispersed nano-sensors. Followed by the addition of solid $Ca_2CO_3$ or EXM757 clay, after vigorously mixing, the solid and the liquid phase were separated by centrifuging. The liquid phase was subsequently characterized using UV-vis and fluorescence spectroscopy.

Testing of influence of crude oil: In a reservoir, crude oil is in close contact with the water phase (brine). The influence of the presence of crude oil in the near vicinity of the water-dispersed nano-sensors was tested using a light North Sea crude oil. As-received crude oil was added to the dispersions. Samples were shaken vigorously and left standing for two hours to redistribute in well-separated phases. The PL spectra of the water phase was recorded, and the optical absorbance of the QDs was compared to the initial situation before addition of the oil.

Figure 1A:
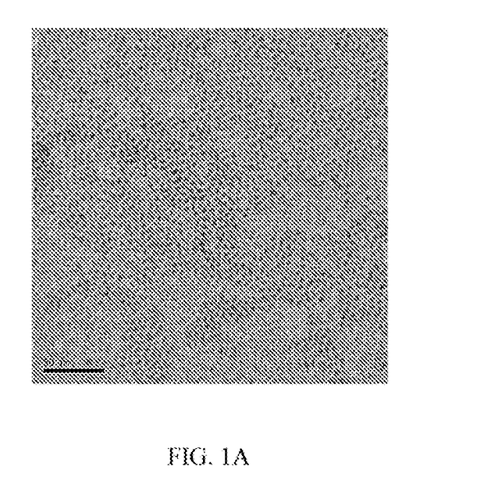
FIG. 1A shows a TEM image of orange InP/ZnS QDs.
Figure 1B:
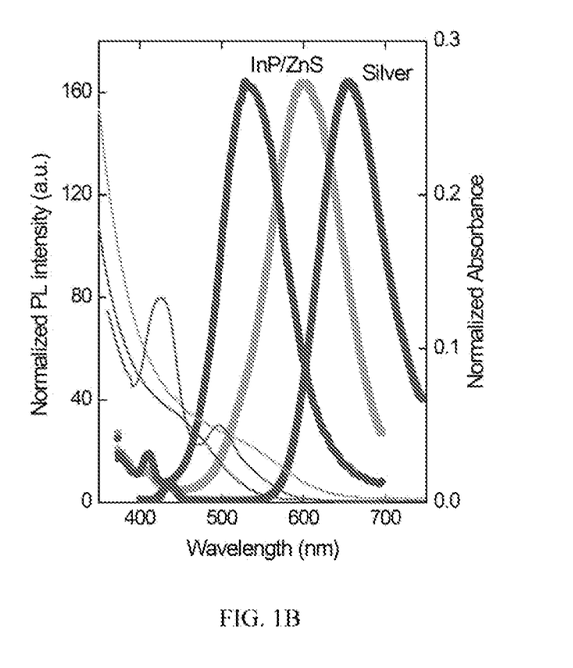
FIG. 1B shows a graph of normalized fluorescence ($\lambda_{exe}$=370 nm; thick lines) and absorbance (thin lines) spectra of InP/ZnS quantum dots and Ag clusters in chloroform and aqueous solutions, respectively, at room temperature.

Results:

Challenging reservoir conditions can affect the stability of the nano-sensor materials. Therefore, several different hulk materials, which are commonly used for QDs, were tested under commonly encountered reservoir conditions (see Supplementary Information disclosed hereinafter). These experiments showed stability for both ZnS as well as $SiO_2$ under the predominant reservoir conditions. Therefore ZnS and/or $SiO_2$ may be selected as a protective outer surface for the QDs. The InP/ZnS QDs were synthesized from indium chloride and tris(trimethylsilyl)phosphine in a mixture of octadecene, stearicacid, zindundecylenate, and hexadecylamine (HDA) in a similar procedure as described by Xu et al.[19] The InP/Zn core had a diameter of respectively 3.1 nm (orange) and 2.4 nm (green), as determined using the exciton energy derived from the emission maximum reference with literature values (see Supplementary Information hereinafter with respect to FIG. 8). The InP/Zn cores were passivated by growing a shell of 2 mono layers ZnS using zincundecylnate and sulfur dissolved in octadecene.[19] The final InP/ZnS quantum dots showed fluorescence maximum at 600 (orange) and 531 nm (green) and a quantum yield of $\eta_F \approx 70\%$ (orange) and $\eta_F \approx 78\%$ (green). FIG. 1A shows the TEM images of the orange InP/ZnS core shell QDs.

The luminescent Ag clusters with an expected size of 4-5 atoms[20] were synthesized by the reduction of silver nitrate in the presence of α-lipoic acid in a similar method as described by Adhikari et al.[20] The Ag clusters showed a clear deep red emission with a maximum at 654 nm, and a sharp first absorption peak at 495 nm with a typical fluorescence quantum yield of $\eta_F$=5%.

Figure 2A:
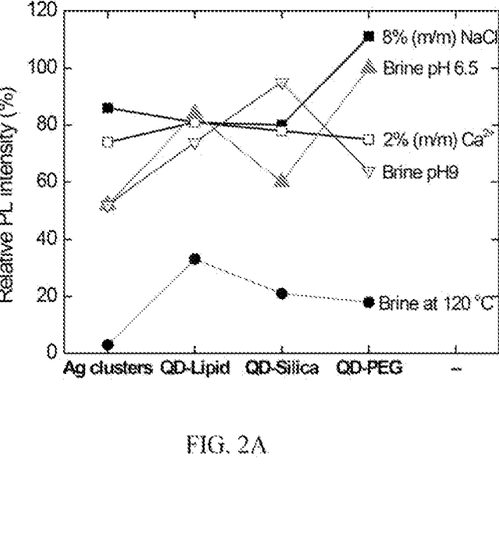
FIG. 2A shows a graph of relative PL intensity of various nano-sensors upon exposure to different reservoir conditions.
Figure 2B:
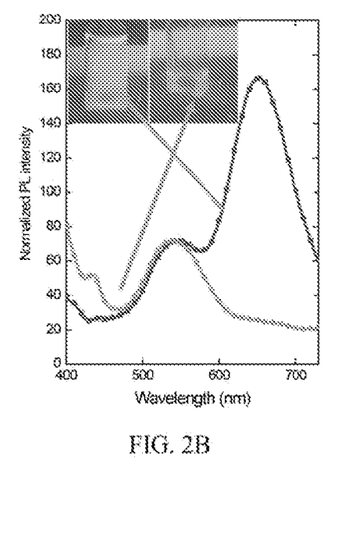
FIG. 2B shows a graph of normalized fluorescence spectra of a mixture of Ag clusters and green emissive PEG-coated QDs; the top line represents the emission spectrum of the Ag/QD mixture in brine prior to heating; the bottom line represents the Ag/QD mixture in brine after heating to 120° C.

Sensor functionality of the nanomaterials was studied under simulated reservoir conditions, using the optical properties of the InP/ZnS QDs and Ag clusters. DHLA-coated Ag clusters and InP/ZnS QDs with PEG-SH, Silica, and PEG lipid surface coatings were tested in commonly encountered reservoir conditions as is described hereinafter. The nano-sensors were subjected to the following variables: temperature, pH, and composition (presence of crude oil or additional solids like clay or calcium carbonate, which are added to the API brine). A "high" salinity brine was formulated in accordance with standards set by the American Petroleum Institute ("API"). As shown in FIGS. 2A-2B, the specific environmental influences on the sensors may cause changes in the photoluminescence (PL) intensity and the optical absorbance spectra. The changes in optical properties are a measure of the stability and the sensor functionality upon exposure to different conditions. In FIGS. 2A-2B, the PL intensity is plotted relative to the intensity in pure water as a function of the different particles under different reservoir conditions. The relative PL intensity shows a small decrease in the presence of high salinity (8% NaCl) and calcium ions (2%) for most of the particles, except for the PEG-lipid coated QDs, which showed a small increase in PL intensity. These differences in PL intensity can be the result of the difference in polarity between pure water and water with (high) salt concentrations. A similar decrease in PL intensity is described for organic chromophores as a consequence of the interaction of their excited energy state and with the solvents polarity.[25,26]

The influence of the different pH levels of the brine dispersions showed significant changes between PL intensities of the diverse particles. The silver clusters with an alpha lipoic acid coating showed an overall decrease in PL intensity of ≈50% for both a high pH 9 and a low pH 6.5. However, an opposite behavior pH dependence was found between the silica-coated QDs and the PEG-SH coated QDs, where an average difference in the relative PL intensity was found of ≈40% at the different pH levels (pH 6.5 and pH 9). Here the silica -coated QDs showed a high relative (94%) PL intensity at pH 9, and PEG-SH coated QDs showed low relative (63%) PL intensity. This was opposite at pH 6.5, where the silica-coated QDs showed a low relative (59%) PL intensity and PEG-SH coated QDs showed high relative (100%) PL intensity. The opposite pH behavior found for these two QDs shows a clear application for a reservoir pH sensor.

An exposure of these nanoparticles to a high temperature results, for all particles, in a strong decrease in PL intensity >60%. At these elevated temperatures, several effects can take place which can cause a decrease in PL intensity. The complete disappearance of the silver cluster emission upon heating was subsequently evaluated by the absorbance spectra of the Ag clusters (see FIG. 7 in the Supplementary Information hereinafter). This shows that clusters degrade at 120° C. in API brine, as the optical absorbance shows a strong decrease upon heating. Furthermore, the decrease in PL intensity of the QDs (see FIG. 2A) can possibly be contributed to an increased mobility of surface-bound ligands and oxidation of the QD surface introducing surface trap states, which reduce the overall PL intensity upon heating. The difference in PL stability of the various nano-sensors enables an application for reservoir temperature monitoring. An example is shown in FIG. 2B where a mixture of Ag clusters (red emission) and PEG-SH coated QDs (green emission) may be used for this purpose in API brines. The emission spectrum shows (upper line) the emission spectrum of the mixture of red thiolated Ag ($\lambda_{max}$'''650 nm) and PEG-SH green emissive ($\lambda_{max}$'''531 nm) coated QDs at room temperature ("RT"), and the inset photo of FIG. 2B shows that this mixture has a clear and predominantly orange emission. Upon heating up to 120° C., the emission spectrum shows the disappearance of the red Ag clusters emission ($\lambda_{max}$=650 nm) and leaves the green QD emission ($\lambda_{max}$=520 nm) as the dominant emission. The effect remains preserved after cooling the sample down to RT. This is shown in the inset photo of FIG. 2B revealing a clear green QD emission.

The presence of mineral solids in the reservoir on which the nano-sensors can absorb is an important element for the sensor composition of embodiments of the present invention. Two mineral solids often encountered in reservoirs are clay and limestone. Stability with respect to immobilization of the nano-sensors onto the natural clay (caused by ion exchange) was evaluated using a natural Na-montmorillonite (e.g., EXM757). This clay exhibits a large cationic exchange capacity and therefore closely resembles some natural clays that are commonly encountered in reservoirs. Limestone is a sedimentary rock, which is primarily composed of $CaCO_3$ crystals. $CaCO_3$ is the primarily naturally occurring source of divalent calcium ions source in reservoirs. This is of significant consequence as it forms a specific thread with respect to the precipitation of anionic nanoparticles dispersions.

Figure 3A:
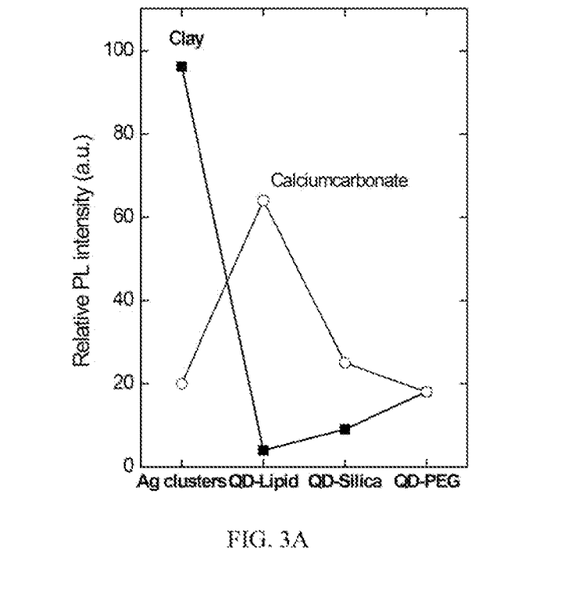
FIG. 3A shows a graph of the relative PL intensity of lipid micelle coated InP/ZnS QDs and silver nanoclusters in the presence of clay or calcium carbonate.
Figure 3B:
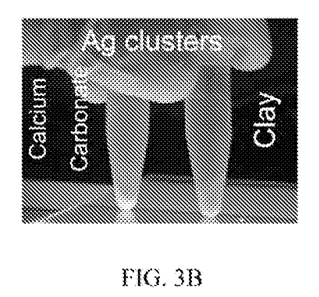
FIG. 3B shows a photograph of the behavior of lipid coated QD and silver nanoclusters in the presence of clay.
Figure 3C:
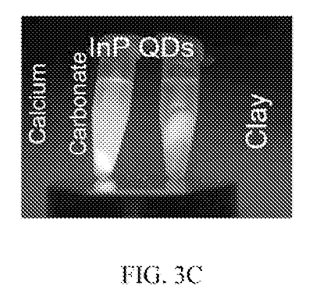
FIG. 3C shows a photograph of the behavior of lipid coated QD and silver nanoclusters in the presence of calcium carbonate.

The API brine dispersed silver cluster and the PEG-lipid coated QDs were mixed with either the clay or the limestone to study the potential selective binding of these nano-sensors. FIG. 3C confirms that red emitting silver clusters do not show precipitation nor selective binding in the presence of EXM757 clay in API brine (pH 6.5). However, in a presence of $CaCO_3$, silver clusters show complete immobilization on the solid $CaCO_3$ as result of the negatively charged carboxylic acid groups on their surface. The orange emitting PEG -micelle coated InP/ZnS QDs, on the other hand, show the opposite behavior. The PEG -micelle coated QDs remain well dispersed in API brine in the presence of additional calcium carbonate, but they reveal selective binding towards the EXM757 clay. This opposite behavior in selective binding of the negatively charged silver clusters and the PEG-micelle coated QDs confirms that combinations of such particles can be used as a sensor with respect to the solids in the reservoir environment.

Figure 4A:
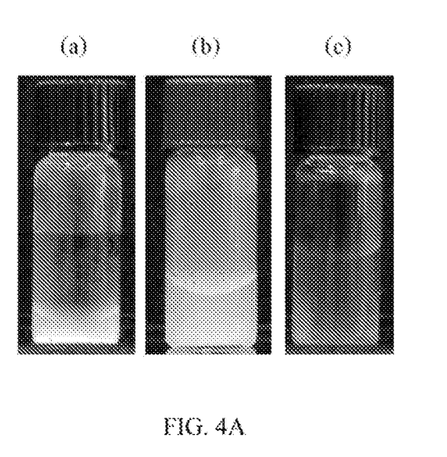
FIG. 4A shows photographs of the behavior of (a) silica and (b) lipid coated InP/ZnS QDs and (c) silver nanoclusters in the presence of crude oil.
Figure 4B:
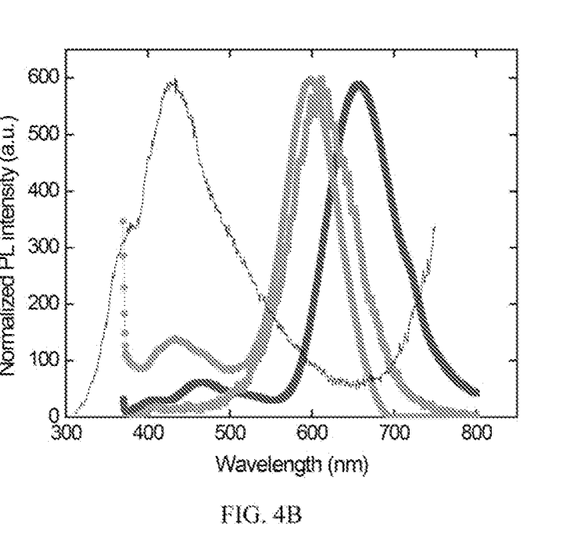
FIG. 4B shows a graph of a normalized PL intensity of the silica-coated (top line), lipid-coated (middle line) InP/ZnS QDs and silver nanoclusters (bottom line) dispersed in the water phase in the presence of crude oil, wherein the thin line to the far left represents the emission spectrum of Shell North Sea crude oil.

The large heterogeneity of the conditions within a reservoir makes the design of the sensor composition challenging. The sensors according to embodiments of the present invention are designed for integration with a water flooding process and should therefore stay confined within the water phase of the reservoir. FIGS. 4A-4B show that the nanoparticles retain their bright luminescence in the presence of crude oil and stay confined in the water phase; they do not partition into the oil phase. The nanoparticles were dispersed in API brine in the presence of Northern sea crude oil. Crude oil is a mixture of a wide variety of hydrocarbons, some of which exhibit fluorescence by themselves.[27] The influence of the crude oil on the stability and luminescence of the nanoparticles is shown in FIGS. 4A (a), (b), and (c). The PL spectra of three types of QD sensors (InP/ZnS-lipid coated, InP/ZnS-silica coated, and Ag-clusters) dispersed in water are shown in FIG. 4B. The presence of crude oil in the vicinity of the QDs did not influence their bright luminescence, which can be clearly discriminated from the crude oil luminescence.

Supplementary Information

Stability Tests on Commonly Materials Typically Used for QDs:

Challenging reservoir conditions are likely to affect the stability of nano-sensor materials; therefore, several different bulk materials, which are typically used for QDs, were tested under commonly encountered reservoir conditions (e.g., acidic and alkaline brine conditions at elevated temperatures).

Materials were tested in bulk form before testing with nanoparticles. An instability of the bulk material is more easily determined and can function as an indication on the expected behavior of the nano-sized form of the materials. The stability of nano-sized materials is in general lower than their macroscopic counterpart.

Bulk CdSe, CdTe, ZnO, ZnS, Si, and $SiO_2$ powders were exposed to hot acidic API brine as well as hot alkaline API brine (see Table 1, which shows stability with respect to reservoir conditions of bulk materials that are conventionally used for QDots). Both the acidic and alkaline brine were buffered with acetic acid (pH 5) and glycine (pH 9), respectively. Samples were heated for approximately 1 hour at 150° C. (e.g., autoclave conditions) after which they were filtered. Precipitation experiments with the filtrate were conducted to confirm stability of the material. Only ZnS and $SiO_2$ met the basic stability requirements. Silicon passes halfway, as it is stable in hot acidic brine but not in the hot alkaline brine.

TABLE 1

|  | CdSe | CdTe | ZnO | ZnS | Si | SiO$_2$ |
|---|---|---|---|---|---|---|
| Hot alkaline API brine | X | X | X | Stable | X | Stable |
| Hot acidic API brine | X | X | X | Stable | Stable | Stable |

Figure 5:
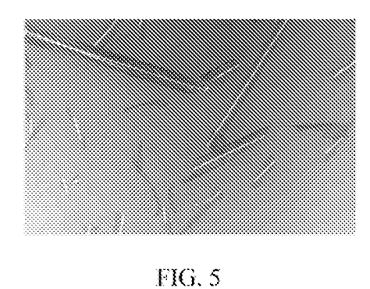
FIG. 5 shows a digital image of dispersed rolls of foil of 200 nm thick amorphous ZnS using an optical microscope (50×).

Subsequently, it was determined if ZnS and SiO$_2$ remain stable when scaling down to the nano-regime. An amorphous 200 nm film of ZnS was synthesized using chemical vapor deposition techniques. This inorganic film however dissolves in hot brine. As shown in FIG. 5, dispersed rolls of foil of 200 nm thick amorphous ZnS are clearly visible using an optical microscopy (50×). However, after exposure to hot brine, they cannot be seen anymore due to degradation.

Figure 6A:
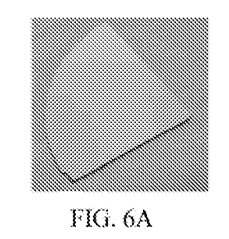
FIG. 6A shows a digital image of a piece of silicon wafer with a 200 nm protective layer of $SiO_2$ before exposure to hot alkaline brine.
Figure 6B:
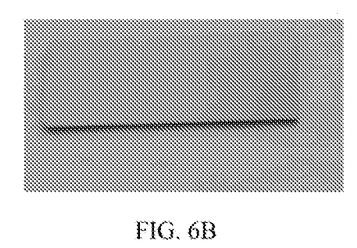
FIG. 6B shows a digital image of a piece of silicon wafer with a 200 nm protective layer of $SiO_2$ after exposure to hot alkaline brine.
Figure 6C:
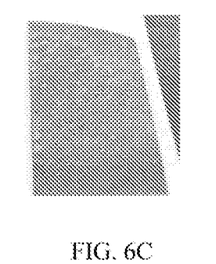
FIG. 6C shows a digital image of an unprotected reference piece of silicon, which is however severely damaged by exposure to hot alkaline brine.

Referring to FIGS. 6A-6C, alternatively, a 500 nm layer of SiO$_2$ was thermally grown on a common silicon wafer. The silica layer was stable and protected a silicon wafer against degradation under influence of hot alkaline brine. Summarizing these experiments, apart from silica, all conventional QD materials that were tested failed. Other materials are required for the sensors that have a much higher chemical stability.

FIG. 6A shows a piece of silicon wafer with a 200 nm protective layer of SiO$_2$ before exposure to hot alkaline brine. FIG. 6B shows a piece of silicon wafer with a 200 nm protective layer of SiO$_2$ after exposure to hot alkaline brine, which looks the same as the piece in FIG. 6A. FIG. 6C shows an unprotected reference piece of silicon that is severely damaged by exposure to hot alkaline brine.

Since it is expected that the divalent nature of the semiconductors could be the main cause of the observed leaching, alternatively, indiumphosphide QD was considered. InP is a trivalent component and therefore more stable compared to cadmiumselenide and other conventionally used QD materials. In addition, the InP core was overcoated with a ZnS shell, which further increased its chemical stability.

Some sulphur components have extremely low dissociation constants, which also explains why ZnS is much more stable than ZnO. Silversulphide is another high stability component.

Degradation of Silver Nanoclusters

Figure 7:
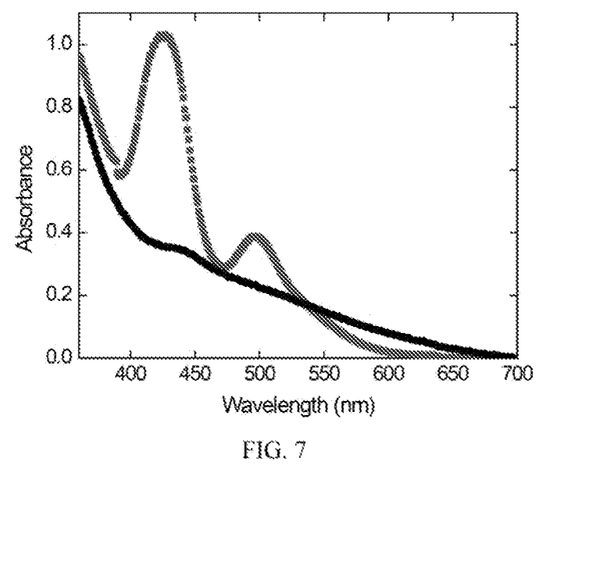
FIG. 7 shows a graph of absorbance spectra of API brine dispersed silver clusters prior to heating (top line) and after heating to 120° C. (bottom line).

The silver nanoclusters revealed a complete disappearance of their luminescence upon heating in API brine. The absorbance spectrum shown in FIG. 7 showed an almost absence of the characteristic absorbance peaks of these silver clusters, indicating that the silver clusters were almost fully degraded upon heating in API brine at 120° C. FIG. 7 shows the absorbance spectra at API brine dispersed silver clusters prior to heating (upper line) and after beating to 120° C. (lower line). Furthermore, precipitation of "reaction products" was observed explaining the slope in the absorbance spectrum as a result of scattering of the incident light.

Figure 8:
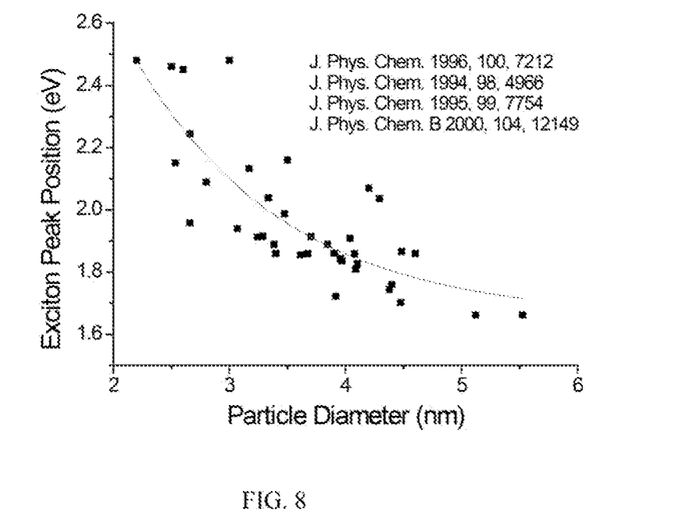
FIG. 8 shows a graph of size dependence of the band gap energy of InP QDs as a function of the particle size.

FIG. 8 is a graph showing size dependence of the band gap energy of InP QDs as a function of the particle size derived from literature.

References, Which Are All Hereby Incorporated By Reference Herein:

1 Smith, R. G.; Mailand, G. C. Trans. I. Chem. E, 1998, 76A, 539-552,
2 Essen, G. M.; Zanvliet, M. J.; Van den Hof, P. M. J.; Bosgra, O. H. IEEE, 2006, 699
3 I. A. Munza, H. Johansen, O. Huseby, E. Rein, O. Scheire, Marine and Petroleum Geology 2010, 27, 838-859
4 Radiotracer applications in industry: a guidebook.—Vienna:International Atomic Energy Agency, 2004, p. 176
5. Buckley S. E.; Leverett, M. C. Trans. AIME 1942, 146, 107-116
6 Elkens, L. F.; Skov A. M. J. Petrol. Technol. 1963, 15, 877-884
7 Dugstad, Ø., Aurdal, T., Galdiga, C., Hundere, I., Torgersen, H. J., SPE Paper Number Texas 1999, 56427
8 Gulati, M. S., Lipman, S. C.; Strobel, C. J. Geothermal Resources Councel, Trans. 1978, 2, 237-240
9 McCabe, W. J.; Barry, B. J.; Manning, M. R. Geothermics, 1983, 12, 83-110
10 Zemel, B. Tracers in the Oil Field, Developments in Petroleum Science, 43, Elsevier Science B. V. 1995
11 Home, R. N. J. Perolt. Technol. 1982, 34, 495-503
12 Barron, A. R.; Tour, J. M.; Busnaina, A. A.; Jung, Y. J.; Somu, S.; Kanj, M. J.; Potter, D., Resasco, D.; Ullo, J. Oilfield Rev. 2010, 22, 38-49
13 Krishnamoorti, R.; Houseten, U. J. Petrol. Technol. 2006, 24
14 Brus, L. J. Phys. Chem. 1986, 90, 2555-2560
15 Gao, X. H., Cui, Y. Y., Levenson, R. M., Chung, L. W. K.; Nie, S. M. Nat. Biotechnol. 2008, 22, 969-976
16 Mulder, W. J. M.; Koole, R.; Brandwijk, R. J.; Storm, G.; Chin, P. T. K.; Strijkers, G. J.; de Mello Donega, C.; Nicolay, K.; Griffioen A. Nano Lett. 2006, 6, 1 -6
17 Zheng, J.; Nicovich, P. R.; Dickson, R. M.; Annu. Rev. Phys. Chem. 2007, 58, 409-431
18 Medintz, I. L.; Uyeda, H. T.; Goldman, E. R.; Mattoussi H. Nat. Mater. 2005, 4, 435-446
19 Xu, S., Ziegler, J. & Nann, T. J. Mater. Chem. 2008, 18, 2653-2656.
20 Adhikari, B., Banerjee, A., Chem. Mater. 2010, 22, 4364-4371
21 Querner, C.; Reiss, P.; Bluese, Pron, A. J. Am. Chem. Soc. 2004, 126, 11574-11582
22 Dubertret, B. et al. Science 2002, 298, 1759-1762.
23 Karstens, T.; Kobs, K. J. Phys. Chem. 1980, 84, 1871-1872.
24 Eaton, D. F. J. Photoch. Photobio. B 1988, 2, 523-531.
25 Do, J.; Huh, J.; Kim, E. Langmuir 2009, 25, 9405-9412
26 Nair, R. B.; Cullum, B. M.; Murphy, C. J. Inorg. Chem. 1997, 36, 962-965
27 John, P.; Souter, I. Anal. Chem. 1976, 48, 520-524.

What is claimed is:

1. A method comprising:
   injecting through an injection well a composition of quantum dots and noble metal clusters into an underground geological formation as part of a water flooding process of the geological formation; and
   recovering through a recovery well at least some of the injected composition of quantum dots and noble metal clusters.

2. The method as recited in claim 1, further comprising comparing chemical properties of the recovered quantum dots and noble metal clusters to chemical properties of the injected quantum dots and noble metal clusters.

3. The method as recited in claim 1, further comprising comparing optical properties of the recovered quantum dots and noble metal clusters to optical properties of the injected quantum dots and noble metal clusters.

4. The method as recited in claim 1, wherein the quantum dots comprise InP/ZnS core shell quantum dots.

5. The method as recited in claim 4, wherein the noble metal clusters comprise atomic silver clusters.

6. The method as recited in claim 4, wherein the InP/ZnS core shell quantum dots comprise a InP/Zn core with an outer shell of ZnS.

7. The method as recited in claim 1, wherein the noble metal clusters comprise atomic silver clusters.

8. The method as recited in claim 1, wherein the quantum dots are coated with a micellar polyethylene glycol coating to make the quantum dots water-soluble.

9. The method as recited in claim 1, further comprising:
comparing optical properties of the recovered quantum dots to optical properties of the injected quantum dots; and
comparing optical properties of the recovered noble metal clusters to optical properties of the injected noble metal clusters.

10. The method as recited in claim 1, wherein the quantum dots comprise a ZnS outer coating.

11. The method as recited in claim 1, wherein the quantum dots comprise a $SiO_2$ outer coating.

12. A system comprising:
a water flood composition comprising quantum dots and noble metal clusters; and
an injection well suitable for injecting the water flood composition into an underground geological formation as part of a water flooding process of the geological formation.

13. The system as recited in claim 12, further comprising:
a recovery well suitable for recovering at least some of the injected water flood composition from the underground geological formation; and
instrumentation suitable for comparing chemical properties of the recovered quantum dots and noble metal clusters to chemical properties of the injected quantum dots and noble metal clusters.

14. The system as recited in claim 12, further comprising:
a recovery well suitable tor recovering at least some of the injected water flood composition from the underground geological formation; and
instrumentation suitable for comparing optical properties of the recovered quantum dots and noble metal clusters to optical properties of the injected quantum dots and noble metal clusters.

15. The system as recited in claim 12, wherein the quantum dots comprise InP/ZnS core shell quantum dots.

16. The system as recited in claim 15, wherein the noble metal clusters comprise atomic silver clusters.

17. The system as recited in claim 16, further comprising:
a recovery well suitable for recovering at least some of the injected water flood composition from the underground geological formation;
instrumentation suitable for comparing optical properties of the recovered InP/ZnS core shell quantum dots to optical properties of the injected InP/ZnS core shell quantum dots; and
instrumentation suitable for comparing optical properties of the recovered atomic silver clusters to optical properties of the injected atomic silver clusters.

18. The system as recited in claim 12, wherein the noble metal clusters comprise atomic silver clusters.

19. The system as recited in claim 12, wherein the quantum dots are coated with a micellar polyethylene glycol coating to make the quantum dots water-soluble in the water flood composition.

20. The system as recited in claim 12, wherein the quantum dots comprise a ZnS outer coating.

* * * * *